(12) United States Patent
Lo (10) Patent No.: US 11,786,059 B2
(45) Date of Patent: Oct. 17, 2023

(54) MEAL DELIVERY VEHICLE

(71) Applicant: Kuang-Chen Lo, Taichung (TW)

(72) Inventor: Kuang-Chen Lo, Taichung (TW)

( * ) Notice: Subject to any disclaimer, the term of this patent is extended or adjusted under 35 U.S.C. 154(b) by 465 days.

(21) Appl. No.: 17/063,262

(22) Filed: Oct. 5, 2020

(65) Prior Publication Data
US 2022/0017006 A1 Jan. 20, 2022

(30) Foreign Application Priority Data
Jul. 20, 2020 (TW) ................................ 109124470

(51) Int. Cl.
| | | |
|---|---|---|
| *B60K 1/00* | (2006.01) | |
| *A47F 10/06* | (2006.01) | |
| *B60P 3/025* | (2006.01) | |
| *B60P 1/64* | (2006.01) | |
| *B60Q 1/50* | (2006.01) | |

(52) U.S. Cl.
CPC ............... *A47F 10/06* (2013.01); *B60K 1/00* (2013.01); *B60P 1/6409* (2013.01); *B60P 1/6418* (2013.01); *B60P 3/0257* (2013.01); *B60Q 1/543* (2022.05)

(58) Field of Classification Search
CPC .... A47F 10/06; A47F 10/00; A47F 2010/065; A47G 23/08; B60K 1/00; B60K 1/04; B60K 2001/0438; B60P 1/6409; B60P 1/6418; B60P 1/00; B60P 3/00; B60P 3/0257; B60P 3/025
See application file for complete search history.

(56) References Cited

U.S. PATENT DOCUMENTS

| | | | | |
|---|---|---|---|---|
| 2,827,130 | A * | 3/1958 | Daifotes | ................. A47F 10/06 105/49 |
| 4,190,134 | A * | 2/1980 | Kato | ....................... A47F 10/06 186/46 |
| 6,557,669 | B2 * | 5/2003 | Abekawa | ................ B60P 3/025 108/22 |
| 7,284,393 | B1 * | 10/2007 | Macmillan | ................ F25D 3/06 62/331 |
| 8,550,229 | B2 * | 10/2013 | Tanaka | .................... A47F 10/06 198/465.1 |

(Continued)

FOREIGN PATENT DOCUMENTS

| | | |
|---|---|---|
| CN | 209629009 U | 11/2019 |
| TW | 201345808 A | 11/2013 |

OTHER PUBLICATIONS

Taiwanese Search Report for Taiwanese Application No. 109124470, dated Dec. 10, 2020, with English translation.

*Primary Examiner* — James M Dolak
(74) *Attorney, Agent, or Firm* — Birch, Stewart, Kolasch & Birch, LLP (57) ABSTRACT

A meal delivery vehicle for delivering foods includes a vehicle unit, a cover unit, and a power supply. The cover unit is mounted to the vehicle unit and cooperates with a carrier surface of the vehicle unit to define a space to receive the foods therein. The cover unit includes a cover and a driving device connected to the cover and operable for converting the cover between a covering state, where the cover covers the space, and an open state, where the cover uncovers the space to allow the space to be in spatial communication with ambient surroundings. The power supply unit is electrically connected to the driving device to provide electricity thereto.

11 Claims, 13 Drawing Sheets

(56) References Cited

U.S. PATENT DOCUMENTS

| | | | | |
|---|---|---|---|---|
| 10,551,851 B2* | 2/2020 | Yu | ................ | G05D 1/0297 |
| 11,155,176 B2* | 10/2021 | Lee | ................ | B60L 1/14 |
| 11,250,459 B2* | 2/2022 | L'Huillier | ................ | G06Q 20/34 |
| 11,350,780 B1* | 6/2022 | Du Bois | ................ | A47F 10/06 |
| 11,478,090 B2* | 10/2022 | Ostojich | ................ | F25D 11/00 |
| 11,548,373 B1* | 1/2023 | Kurczewski | ................ | B60K 11/08 |
| 11,645,696 B2* | 5/2023 | Ferguson | ................ | G05D 1/0231 |
| | | | | 701/516 |
| 2012/0012441 A1* | 1/2012 | Ishino | ................ | B65G 17/22 |
| | | | | 198/793 |

* cited by examiner

MEAL DELIVERY VEHICLE

CROSS-REFERENCE TO RELATED APPLICATION

This application claims priority of Taiwanese Invention Patent Application No. 109124470, filed on Jul. 20, 2020.

FIELD

The disclosure relates to a device for delivering foods to tables, more particularly to a meal delivery vehicle.

BACKGROUND

Figure 1:
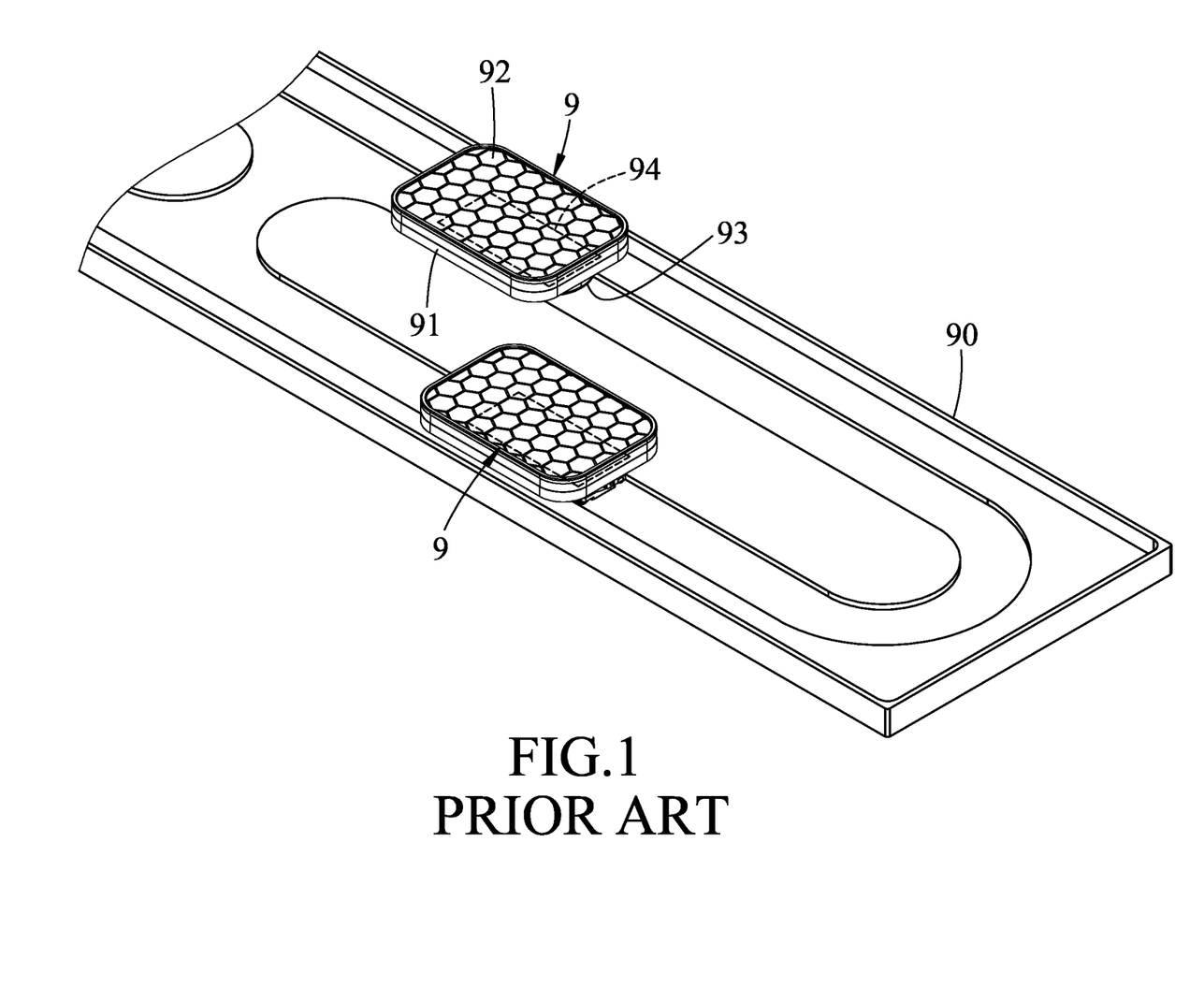
FIG. 1 is a schematic fragmentary perspective view of a conventional meal delivery system disclosed in Taiwanese Patent Application No. 108136081.

Referring to FIG. 1, Taiwanese Patent Application No. 108136081 discloses a conventional meal delivery system to be used to deliver foods (not shown) in a restaurant. The conventional meal delivery system includes a rail 90 and a plurality of delivering vehicles 9. Each of the delivering vehicles 9 includes a bottom seat 91, a carrier plate 92, a wheel set 93, and a control unit 94. For each of the delivering vehicles 9, the carrier plate 92 is disposed on top of the bottom seat 91 for carrying the foods (not shown). The wheel set 93 is mounted under the bottom seat 91 and includes at least two wheels (not shown) driven by motors (not shown) to rotate. The control unit 94 is mounted to the bottom seat 91 for controlling operation of the wheel set 93 so as to drive the delivering vehicle 9 to move along the rail 90.

Recently, the government is encouraging a new life for epidemic prevention. In order to maintain proper dining distances or to avoid food contamination, it is necessary to implement some precautionary measures such as separating seats with partitions or providing individual set meals when dining in restaurants.

SUMMARY

Therefore, the object of the disclosure is to provide a meal delivery vehicle that can prevent contamination to foods when delivering the foods in a restaurant.

According to the disclosure, a meal delivery vehicle for delivering foods is provided. The meal delivery vehicle includes a vehicle unit, at least one cover unit, and a power supply unit. The vehicle unit has at least one carrier surface adapted for carrying the foods. The cover unit is mounted to the vehicle unit and cooperates with the carrier surface to define an accommodating space that is adapted to receive the foods therein. The cover unit includes two mounting seats, a fresh-keeping cover, and a driving device. The mounting seats are mounted on the vehicle unit and are spaced apart from each other in a front-rear direction. The fresh-keeping cover includes a rotated portion and a connecting portion that are mounted respectively to the mounting seats. The rotated portion is rotatable about a rotating axis that extends through the mounting seats, that is parallel to the front-rear direction, and that is located above the carrier surface along an up-down direction transverse to the front-rear direction. Rotation of the rotated portion about the rotating axis results in conversion of the fresh-keeping cover between a covering state and an open state. The fresh-keeping cover covers the accommodating space when in the covering state, and uncovers the accommodating space to allow the accommodating space to be in spatial communication with ambient surroundings when in the open state.

The driving device is operable for converting the fresh-keeping cover between the covering state and the open state, and includes a rotating member, a linkage set, and a driver module. The rotating member is rotatably mounted to one of the mounting seats which is mounted with the rotated portion and is connected co-rotatably to the rotated portion for rotating the rotated portion such that the fresh-keeping cover is converted between the covering state and the open state. The linkage set is connected to the rotating member for driving rotation of the rotating member. The driver module is connected to the linkage set for driving the linkage set to rotate the rotating member. The power supply unit is electrically connected to the driving device to provide electricity thereto.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the present invention is described in greater detail, it should be noted that where considered appropriate, reference numerals or terminal portions of reference numerals have been repeated among the figures to indicate corresponding or analogous elements, which may optionally have similar characteristics.

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

Referring to FIGS. 2 to 5, the first embodiment of a meal delivery vehicle 100 according to the present disclosure is shown. The meal delivery vehicle 100 is communicatively connected to a central control device 81 to be controlled thereby and is movable along a rail 82 to convey two carrier plates 83 for carrying foods (not shown). The meal delivery vehicle 100 includes a vehicle unit 2, a wheel unit 3, a control unit 4, a power supply unit 5, and at least one cover unit 6.

Figure 2:
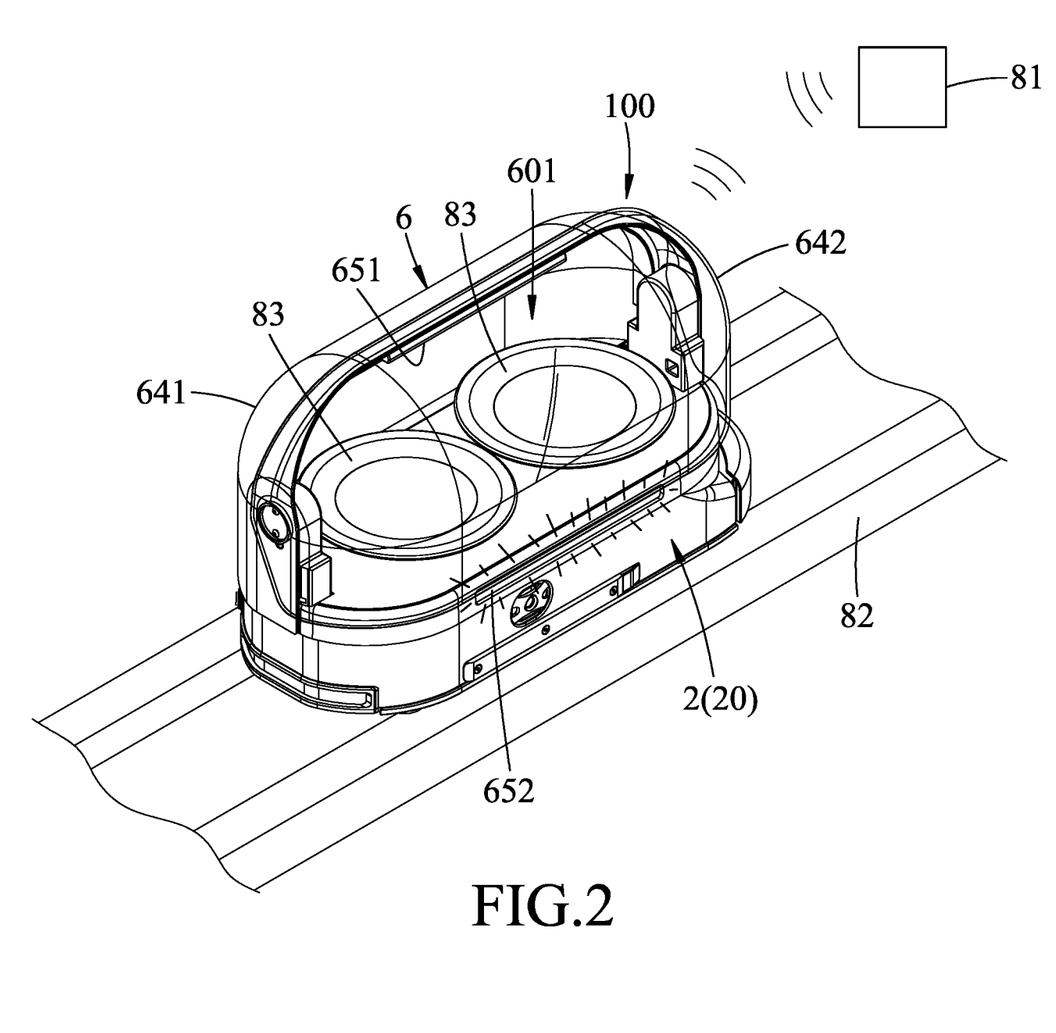
FIG. 2 is a schematic fragmentary perspective view illustrating a meal delivery vehicle according to a first embodiment of the present disclosure disposed on a rail.
Figure 3:
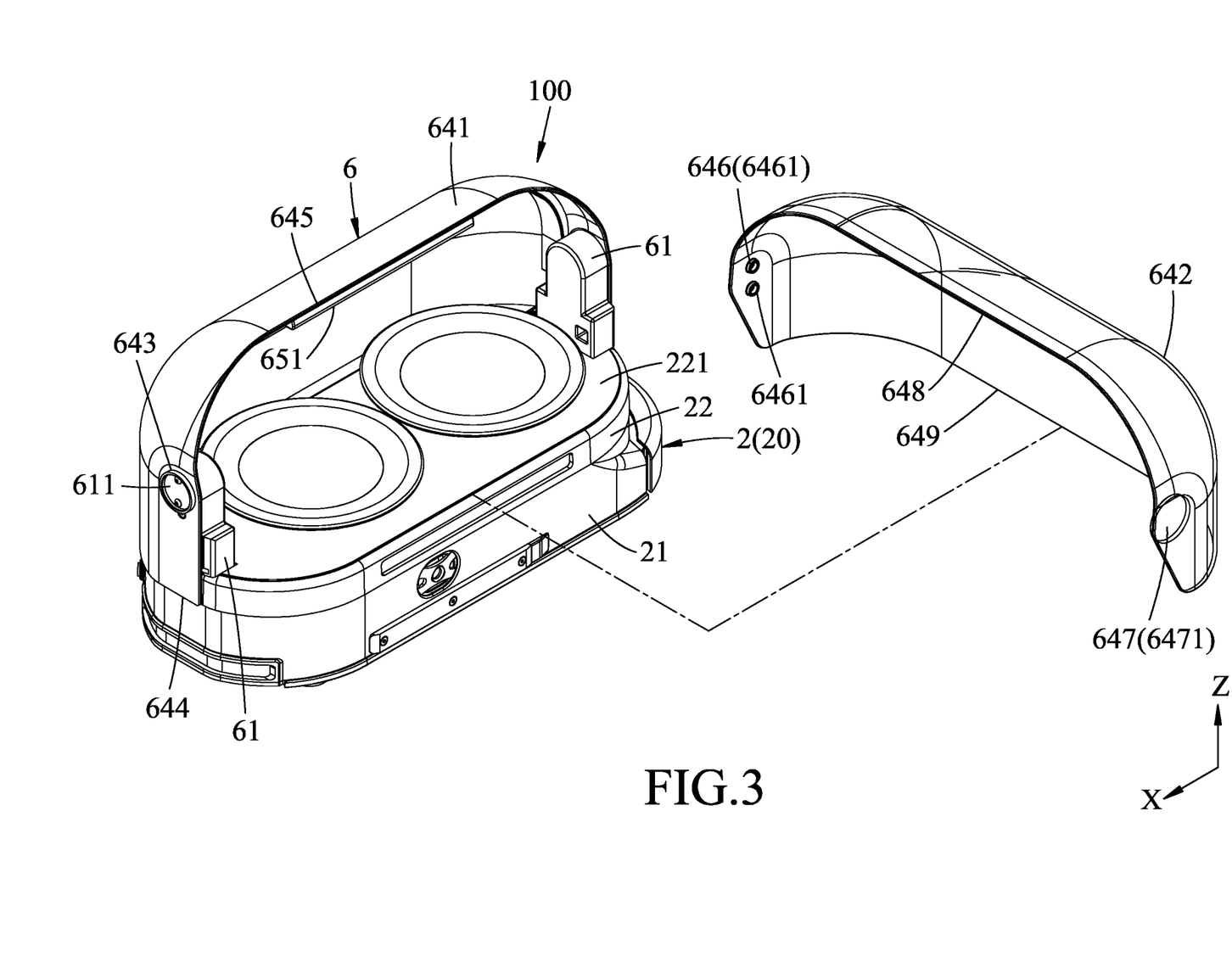
FIG. 3 is a partly exploded perspective view of the first embodiment, illustrating a cover unit of the meal delivery vehicle including a movable cover part detachably mounted to a fixed cover part.
Figure 4:
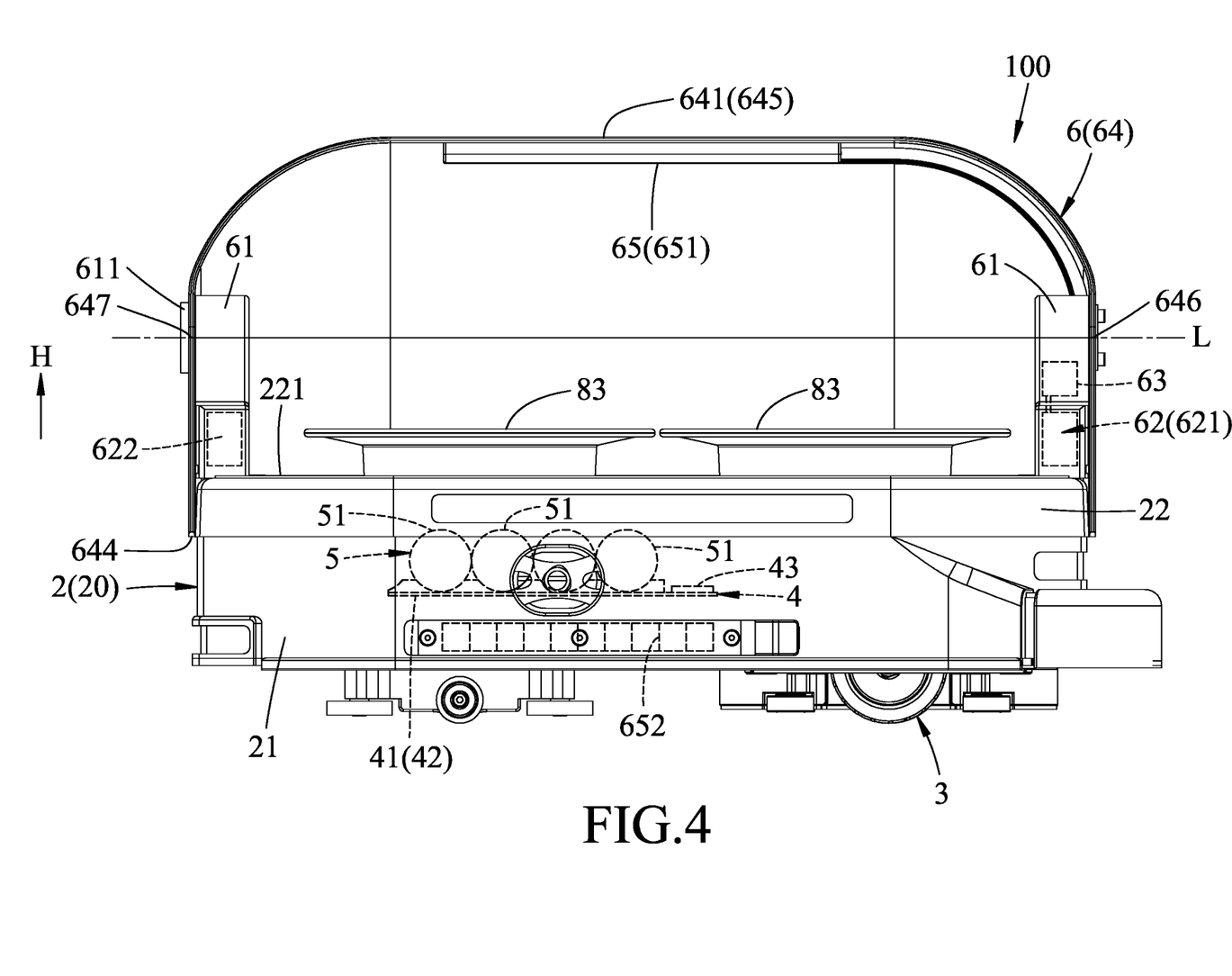
FIG. 4 is a schematic side view illustrating detailed structures of the cover unit.

The vehicle unit 2 includes a vehicle body 20 including a base seat 21 and a carrier seat 22. The carrier seat 22 is mounted on top of the base seat 21 along an up-down direction (Z), and has a carrier surface 221 adapted for carrying the foods. In this embodiment, two carrier plates 83 are disposed on the carrier surface 221, but the number of the carrier plates 83 can be modified as required and the present disclosure is not limited to the number of the carrier plates 83.

The wheel unit 3 is rotatably mounted to the vehicle unit 2, and is electrically connected to the power supply unit 5 for receiving electricity provided therefrom so as to drive the wheel unit 3 to rotate.

Figure 5:
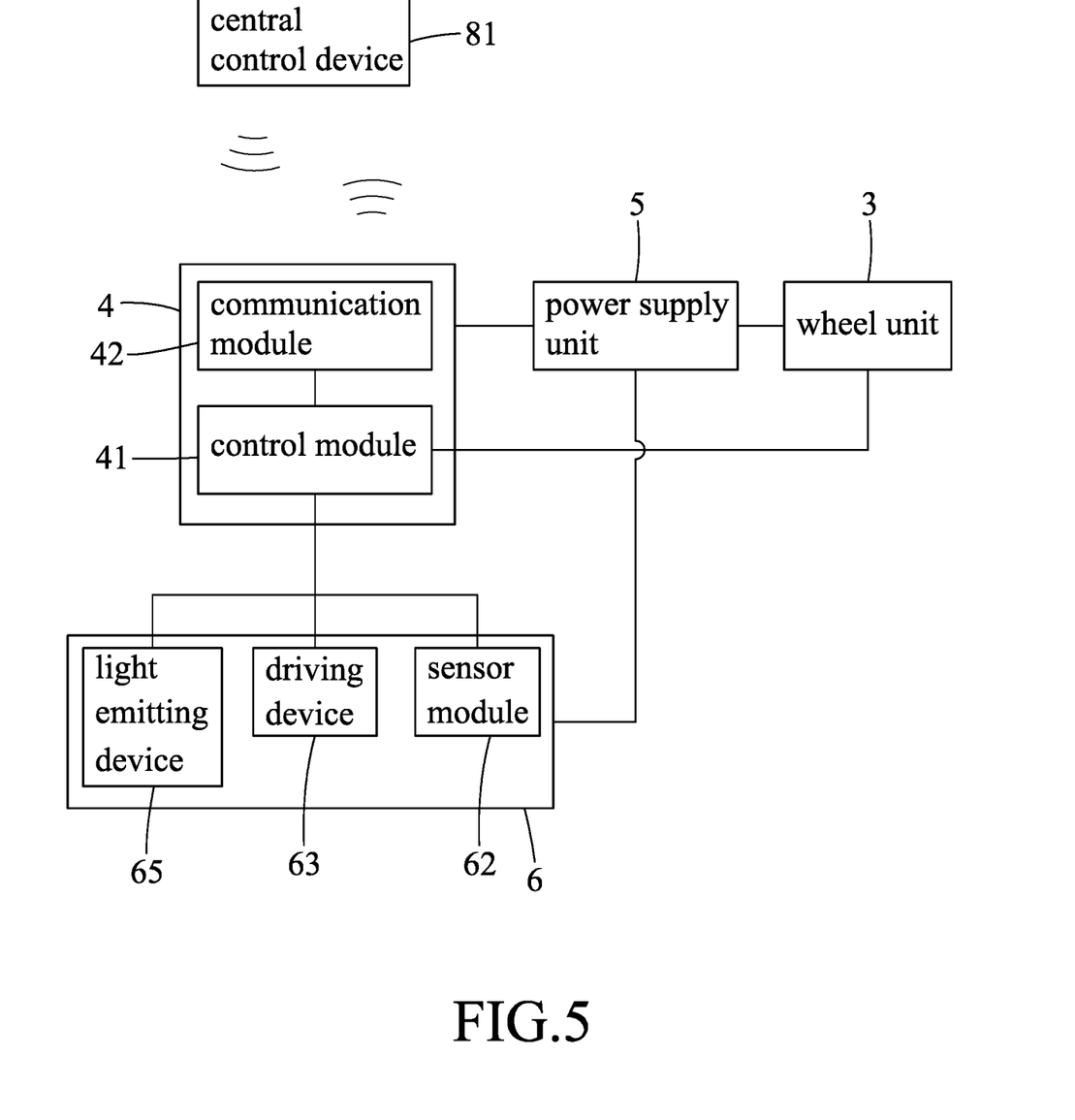
FIG. 5 is a schematic block diagram illustrating electrical connections among components of the meal delivery vehicle of the first embodiment.

The control unit 4 includes a control module 41 and a communication module 42. The control module 41 is electrically connected to the wheel unit 3 for controlling operation of the wheel unit 3. The communication module 42 is communicatively connected to the control module 41, is mounted in the base seat 21, and is adapted to communicate with the central control device 81. As such, instructions can be transmitted between the central control device 81 and the control module 41 so as to control operation of the meal delivery vehicle 100. In this embodiment, the central control device 81 communicates with the communication module 42 via wireless communication, and the control module 41 communicates with the communication module 42 via electrical connection. Note that the communications among the central control device 81, the control module 41, the communication module 42 are not limited to the examples described herein and can use wired and wireless transmission protocols as required.

The term "control unit" and "central control device" as used throughout the specification may refer to any device or portion of a device that processes electronic data from registers and/or memory to transform that electronic data into other electronic data. For example, each of the control unit 41 and the central control device 81 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), or the like.

The power supply unit 5 is mounted in the base seat 21 and is electrically connected to the wheel unit 3 and the control unit 4 to provide electricity to the wheel unit 3 and the control unit 4. In this embodiment, the power supply unit 5 includes a plurality of rechargeable batteries 51 that are configured to be charged wirelessly, so that it is not required to detach the rechargeable batteries 51 from the base seat 21 and is relatively convenient to charge the rechargeable batteries 51. In other embodiments, the rechargeable batteries 51 may be charged by a charging cable or may be replaced by disposable batteries.

Further referring to FIGS. 6 to 9, the cover unit 6 is mounted to the vehicle unit 2, cooperates with the carrier surface 221 to define an accommodating space 601 that is adapted to receive the foods therein, and includes two mounting seats 61, a sensor module 62, a driving device 63, a fresh-keeping cover 64, and a light emitting device 65.

The mounting seats 61 are mounted on the vehicle unit 2 and are spaced apart from each other in a front-rear direction (X) transverse to the up-down direction (Z). The front one of the mounting seats 61 in FIG. 3 includes a first positioning member 611 configured as a disk formed with an annular flange along a periphery thereof.

The sensor module 62 is adapted to sense presence of the foods in the accommodating space 601, and is electrically connected to the control module 41 to output a corresponding signal to the control module 41 and thus to the central control device 81 via communication module 42. In this way, the central control device 81 communicating with the communication module 42 is capable of receiving the signal output from the sensor module 62 to issue suitable instructions to control operation of the cover unit 6.

In this embodiment, the sensor module 62 is, for example, an infrared sensor module including an emitter 621 and a receiver 622 mounted respectively at the mounting seats 61 for detecting presence of the foods in the accommodating space 601. Note that in other embodiments, the sensor module 62 may be a weight sensor such as a load cell mounted under the carrier plates 83 for sensing presence of the foods. A photo-switch, a capacitor switch, a resistance switch and any other sensors and switches capable of sensing presence of objects such as the foods disposed in the accommodating space 601 may be utilized as the sensor module 62, and the implementation of the sensor module 62 is not limited to the examples described herein.

Figure 6:
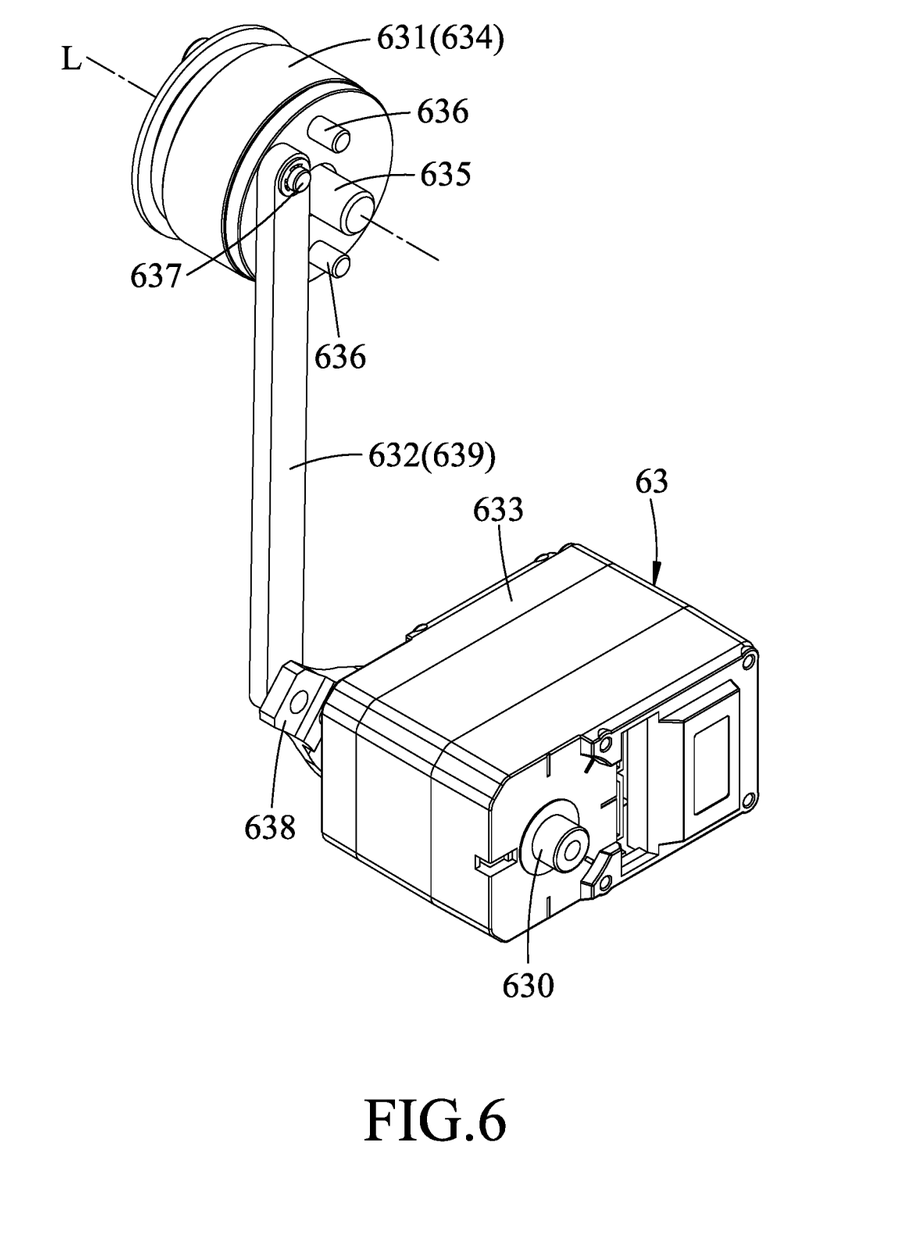
FIG. 6 is a perspective view of a driving device of the cover unit of the first embodiment.
Figure 7:
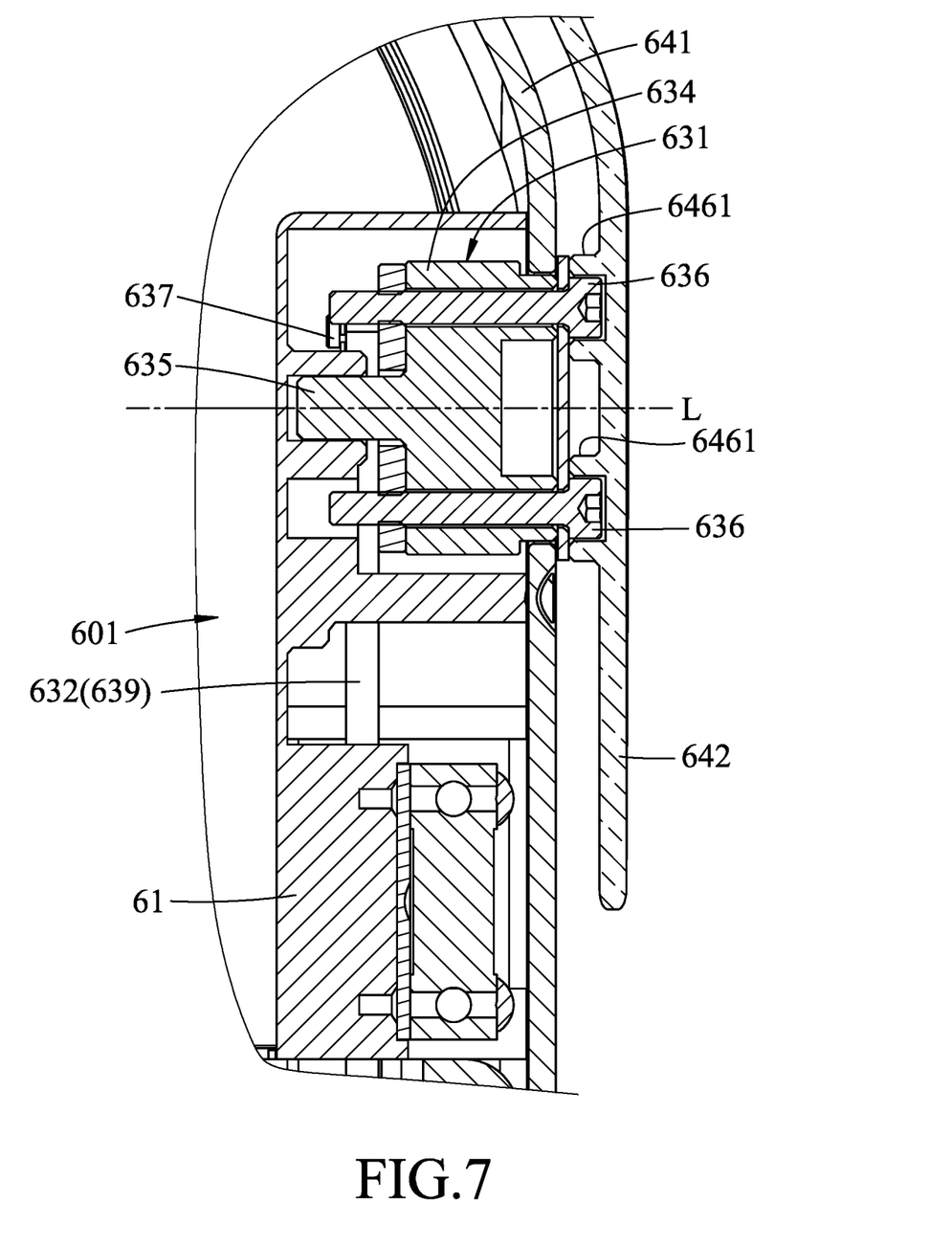
FIG. 7 is a fragmentary sectional view of the cover unit of the first embodiment, illustrating the structure of the driving device connected to the movable cover part.

As shown in FIG. 6, the driving device 63 includes a rotating member 631, a linkage set 632, and a driver module 633. The rotating member 631 is rotatably mounted to one of the mounting seats 61, and is rotatable about a rotating axis (L). The rotating axis (L) extends through the mounting seats 61, is parallel to the front-rear direction (X), and is located above the carrier surface 221 along the up-down direction (Z). In this embodiment, the rotating member 631 is mounted to the rear one of the mounting seats 61 shown in FIG. 3, and is not visible in FIG. 3. The rotating member 631 includes a main body 634, a central shaft 635, and two second positioning elements 636.

The central shaft 635 protrudes outwardly of the main body 634 toward the accommodating space 601 and is pivotally mounted to the rear one of the mounting seats 61. The second positioning elements 636 extend through the main body 634 and are diametrically opposite to each other with respect to the central shaft 635. In this embodiment, the second positioning elements 636 are two bolts extending through the main body 634 with their heads being exposed outwardly of the main body 634. The main body 634 of the rotating member 631 has a rotating joint 637 connected to the linkage set 632 so as to be driven to rotate by the driver module 633. Specifically, the driver module 633 includes a rotating shaft 630 rotatable about a central axis thereof and is, for example, a servo motor in this embodiment. The linkage set 632 includes a swing arm 638 and a link 639. The swing arm 638 is connected co-rotatably to the rotating shaft 630. The link 639 pivotally interconnects the swing arm 638 and the rotating member 631 so as to drive the rotating member 631 to rotate about the rotating axis (L) when the rotating shaft 630 is rotated.

Figure 10:
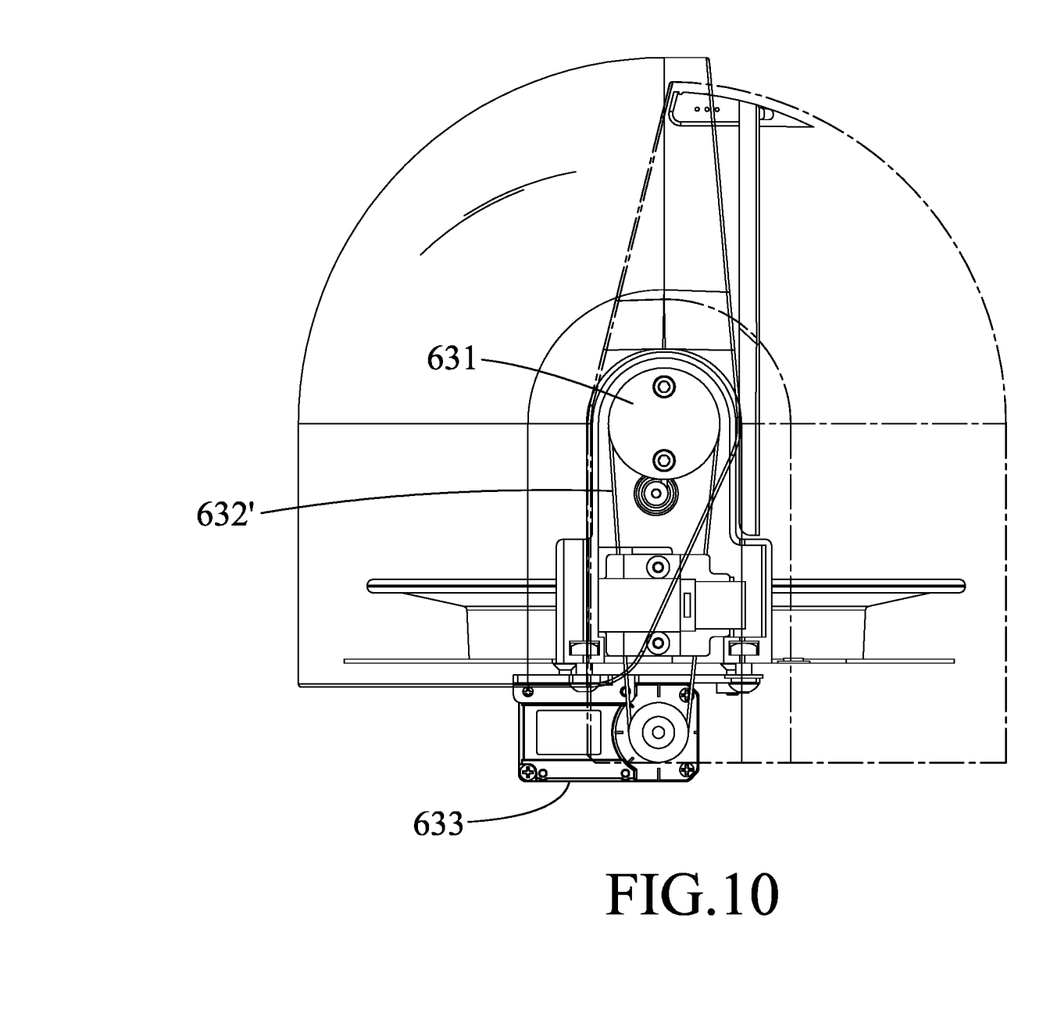
FIG. 10 is a schematic side view illustrating a modification of the driving device and the fresh-keeping cover that is connected to the modified driving device and that is in the covering state.

Note that the configuration of the linkage set 632 can be varied in other embodiments of the present disclosure. For example, referring to FIG. 10, the linkage set 632 shown in FIG. 6 is modified as a belt and pulley system 632', and can be modified as a combination of a chain and a sprocket, a cable and wheels, and any other mechanisms as long as the driver module 633 connected thereto can be driven to rotate the rotating member 631.

As shown in FIG. 5, since the driving device 63 is electrically connected to the control module 41, the driver module 633 is controlled by the control module 41 and can be remotely controlled by the control device as required. In other embodiments, the driver module 633 may be electrically connected to a switch (not shown) that is mounted on the vehicle unit 2 and that can be switched manually to control operation of the driver module 633. The power supply unit 5 is electrically connected to the cover unit 6 to provide electricity to the sensor module 62 and the driving device 63.

The fresh-keeping cover 64 includes a fixed cover part 641 and a movable cover part 642. The fixed cover part 641 is mounted fixedly to the mounting seats 61, and has a top edge 645 located above the rotating axis (L) along the up-down direction (Z) and a lower edge 644 located under the carrier surface 221 along the up-down direction (Z). The fixed cover part 641 has a front end formed with a through bore 643 through which the first positioning member 611 of the front one of the mounting seats 61 extends, and a rear end connected fixedly to the rear one of the mounting seats 61 and formed with another bore (not shown) which is mounted with the rotating member 631. The fixed cover part 641 is made of an opaque material in this embodiment and can be made of a light transmissive material in other embodiments of the present disclosure.

The movable cover part 642 has a first edge 648, a second edge 649, and front and rear ends formed respectively with a connecting portion 647 and a rotated portion 646. The rotated portion 646 and the connecting portion 647 are mounted respectively to the mounting seats 61. Specifically, the movable cover part 642 is detachably connected to the front one of the mounting seats 61 at the connecting portion 647, and is detachably connected to the rotating member 631 at the rotated portion 646. In this way, when it is required to replace the movable cover part 642, for example, when the movable cover part 642 is broken or is blurred, the movable cover part 642 can be easily detached from the remaining portion of the meal delivery vehicle 100 and be replaced in a relatively simple manner. Further, the connecting portion 647 of the movable cover part 642 is connected pivotally to the fixed cover part 641.

In this embodiment, the movable cover part 642 includes a first connecting element 6471 and two second connecting elements 6461. The first connecting element 6471 is formed at the connecting portion 647 and is pivotally connected to the first positioning member 611 of the front one of the mounting seats 61. The second connecting elements 6461 are formed at the rotated portion 646, and are connected respectively to the second positioning elements 636 of the rotating member 631 such that the movable cover part 642 is driven to rotate about the rotating axis (L) by the rotating member 631 through the second positioning elements 636. By virtue of the number of the second connecting elements 6461, the stability of rotation of the movable cover part 642 can be ensured. In this embodiment, the first connecting element 6471 and the second connecting elements 6461 are configured as annular flanges, and the first connecting element 6471 has a diameter greater than that of each of the second connecting elements 6461. The configurations of the first and second connecting elements 6471, 6461 can be modified as long as the rotated portion 646 can be driven to rotate by the driving device 63 and the connecting portion 647 can be pivotally connected to the fixed cover part 641, and are thus not limited to the examples described herein.

Figure 8:
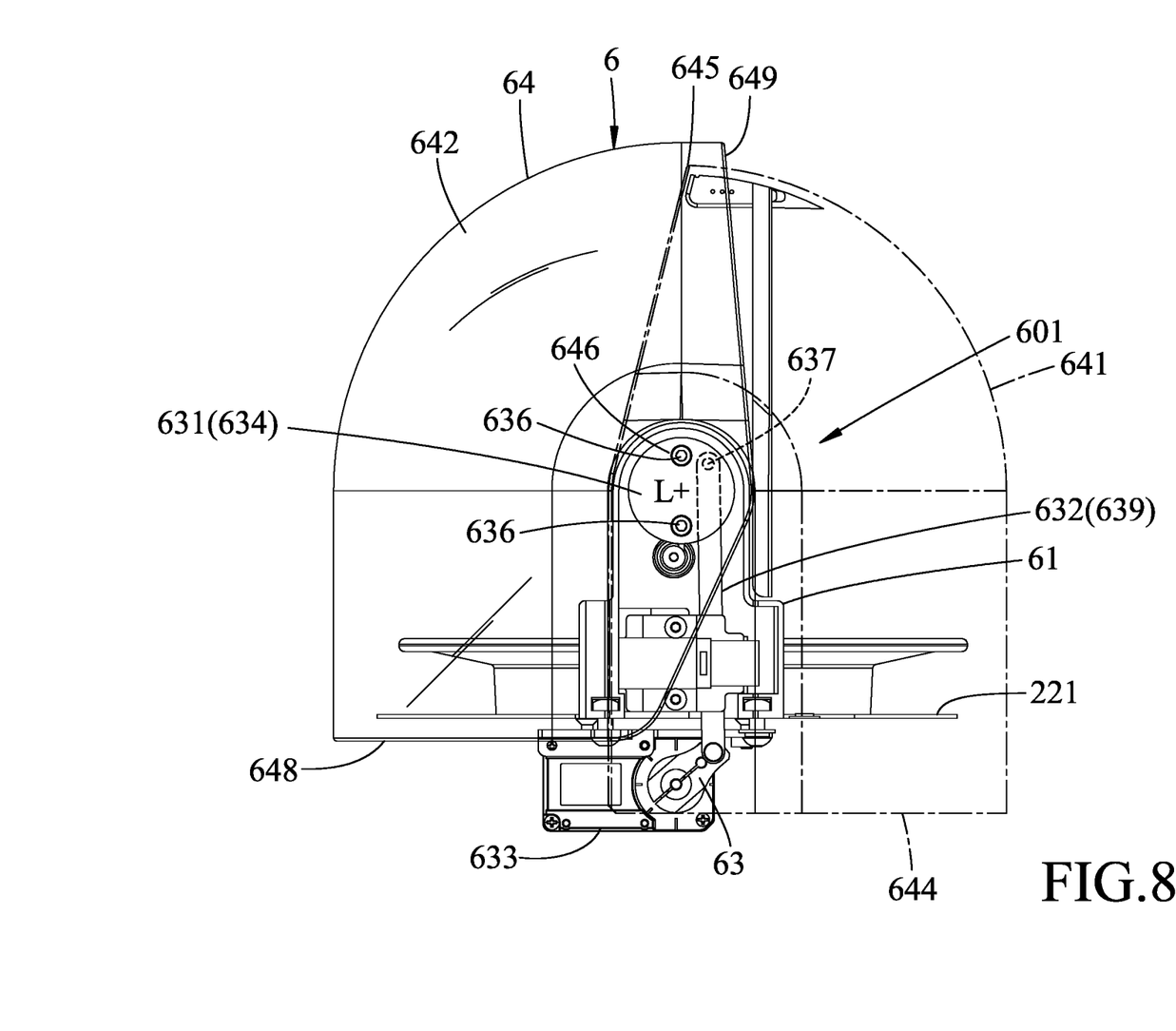
FIG. 8 is a schematic side view of the first embodiment, illustrating the driving device and the fresh-keeping cover that is connected to the driving device and that is in the covering state.
Figure 9:
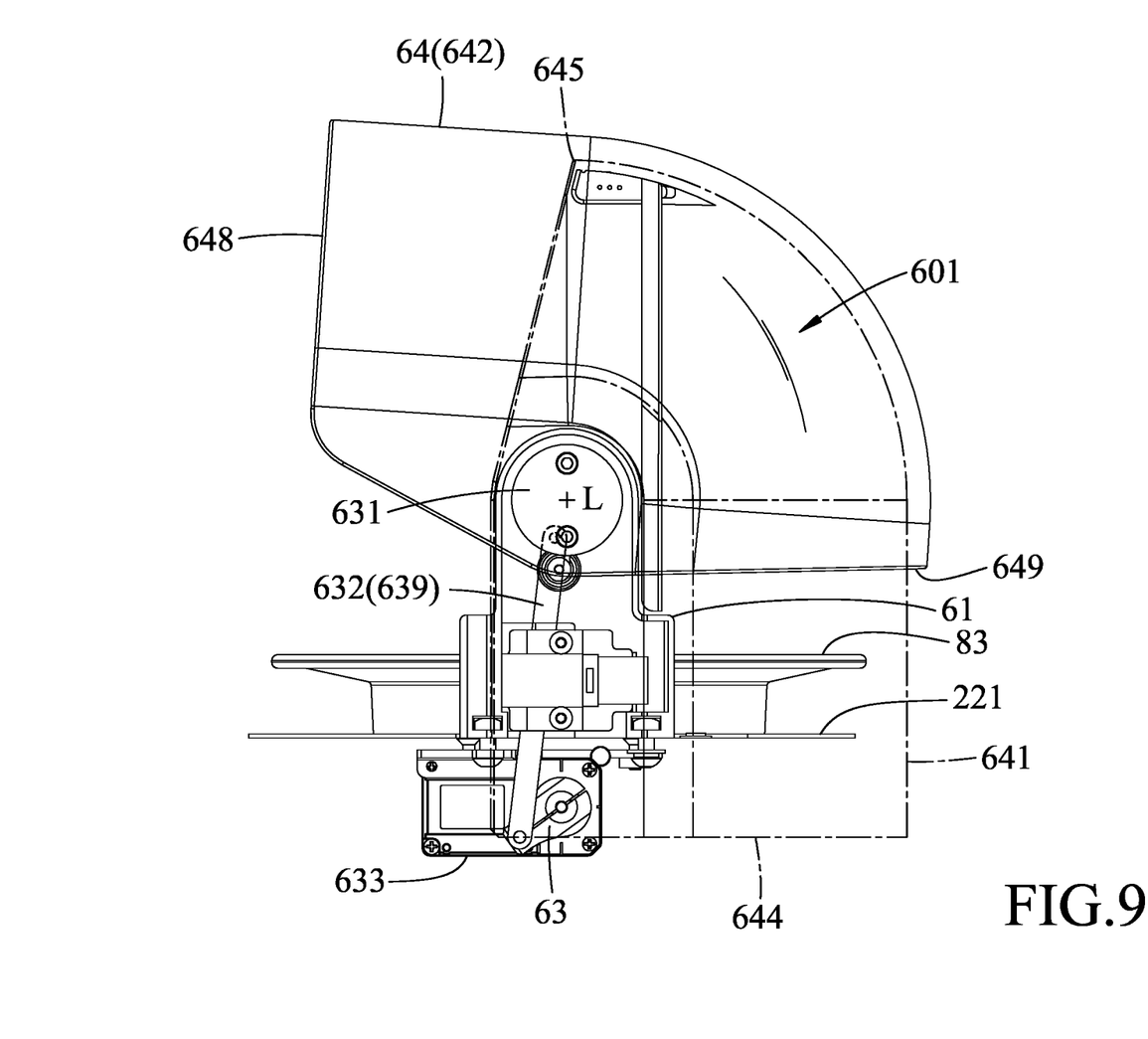
FIG. 9 is a schematic side view similar to FIG. 8, but illustrating the fresh-keeping cover being in the open state.

As shown in FIGS. 8 and 9, the rotated portion 646 is connected co-rotatably to the rotating member 631 of the driving device 63, and is driven by the rotating member 631 to rotate about the rotating axis (L) to convert the fresh-keeping cover 64 between a covering state (see FIG. 8) and an open state (see FIG. 9). The fresh-keeping cover 64 covers the accommodating space 601 when in the covering state so as to prevent the foods disposed in the accommodating space 601 from being contaminated. In this embodiment, the movable cover part 642 is made of a light transmissive material to allow the accommodating space 601 to be observed.

The fresh-keeping cover 64 uncovers the accommodating space 601 when in the open state to allow the accommodating space 601 to be in spatial communication with ambient surroundings so as to place the foods into or remove the foods from the accommodating space 601. The first edge 648 of the movable cover part 642 is disposed between the rotated portion 646 and the connecting portion 647, is disposed adjacent to the top edge 645 of the fixed cover part 641 when the fresh-keeping cover 64 is in the open state, and is disposed adjacent to the carrier surface 221 when the fresh-keeping cover 64 is in the covering state. The second edge 649 is opposite to the first edge 648 and is also disposed between the rotated portion 646 and the connecting portion 647, is disposed adjacent to the top edge 645 of the fixed cover part 641 when the fresh-keeping cover 64 is in the covering state, and is disposed adjacent to the carrier surface 221 when the fresh-keeping cover 64 is in the open state.

Note that in other embodiments, the number of the driving device 63 can be increased to two, and the driving devices 63 are mounted respectively and co-rotatably to the connecting portion 647 and the rotated portion 646. In this case, the movable cover part 642 is driven to rotate by the two driving devices so that the stability of rotation of the movable cover part 642 can be increased. In this way, the movable cover part 642 can be replaced with another movable cover having a larger dimension and heavier in weight as compared to the movable cover part 642 shown in FIG. 3.

In this embodiment, when the fresh-keeping cover 64 is in the open state, the fixed cover part 641 is located in the movable cover part 642. in other embodiments, when the fresh-keeping cover 64 is in the open state, the movable cover part 642 may be located in the fixed cover part 641. Thus, the foods disposed in the accommodating space 601 are accessible from different directions.

Referring back to FIGS. 2 to 5, the light emitting device 65 is electrically connected to the control module 41 to be controlled thereby, is adapted for providing illumination to the foods disposed in the accommodating space 601, and includes a first light element 651 and a second light element 652.

The first light element 651 is disposed in the accommodating space 601, is mounted to an inner surface of the fixed cover part 641 at a position adjacent to the top edge 645 of the fixed cover part 641, and is adapted for illumination of the foods to provide a brighter appearance to the foods, thus making the foods look more delicious. In this embodiment, the first light element 651 further includes an ultraviolet disinfection lamp for disinfecting the foods. In this way, the foods disposed in the accommodating space 601 can be disinfected so as to increase food safety.

The second light element 652 is mounted to the vehicle unit 2 for decoration and notifying arrival of the foods. In this embodiment, the second light element 652 is a light emitting strip capable of emitting lights with multiple colors. When the meal delivery vehicle 100 is moved to a designated position on the rail 82, the central control device 81 controls the first light element 651 to be turned off, controls the driving device 63 to convert the fresh-keeping cover 64 to the open state, and controls the second light element 652 to continuously emit light or to flash so as to notify the user of arrival of the foods. Note that the driver module 633 can be controlled manually, e.g., by operating a switch, to convert the fresh-keeping cover 64 between the open and covering states, and the present disclosure is not limited to the specific approach for controlling the driver module 633.

In this embodiment, the control unit 4 further includes a speaker module 43 (see FIG. 4) electrically connected to the control module 41 to be controlled thereby so as to output sound for notifying arrival of the foods.

The advantages of the present disclosure are described below. By virtue of the present disclosure, the foods disposed in the accommodating space 601 and carried by the vehicle unit 2 can be protected by the fresh-keeping cover 64 from being contaminated when the meal delivery vehicle 100 is conveyed along the rail 82. Further, the driving device 63 that is operable for converting the fresh-keeping cover 64 between the covering and open states is controlled by the central control device 81, and thus the need for direct contact with the fresh-keeping cover 64 to open the fresh-keeping cover 64 by hand is eliminated. In this way, cross contamination can be avoided and such design is beneficial to epidemic preventive measures. Additionally, the sensor module 62 that senses presence of the foods in the accommodating space 601, and outputs the corresponding signal to the control module 41 and thus to the central control device 81, so as to allow a staff to learn presence of the foods in the vehicle unit 2 without observing the accommodating space 601. The mounting seats 61 on which the fresh-keeping cover 64 is mounted are specifically designed to raise the height of the rotating axis (L) along the up-down direction (Z) so as to increase the dimension of the accommodating space 601 along the up-down direction (Z) and to permit the foods with a relatively tall height to be received in the accommodating space 601. Thus, the applicability of the present disclosure is relatively good. The movable cover part 642 is detachably connected to the mounting seats 61 through the design of the first positioning member 611 that is pivotally connected the first connecting element 6471, and the second positioning elements 636 that are connected respectively and detachably to the second connecting elements 6461, so that replacement of the movable cover part 642 is relatively simple. Further, the movable cover part 642 is made of a light transmissive material such as plastic to allow the user to observe the foods disposed in the accommodating space 601 and the cost for making the movable cover 642 is also relatively low. The first light element 651 illuminates the foods disposed in the accommodating space 601 to provide a better appearance of the foods and to disinfect the accommodating space 601 to increase food safety. Finally, the second light element 652 that is controlled to continuously emit light or to flash, and the speaker module 43 that is controlled to output sound for notifying effectively arrival of the foods.

Figure 11:
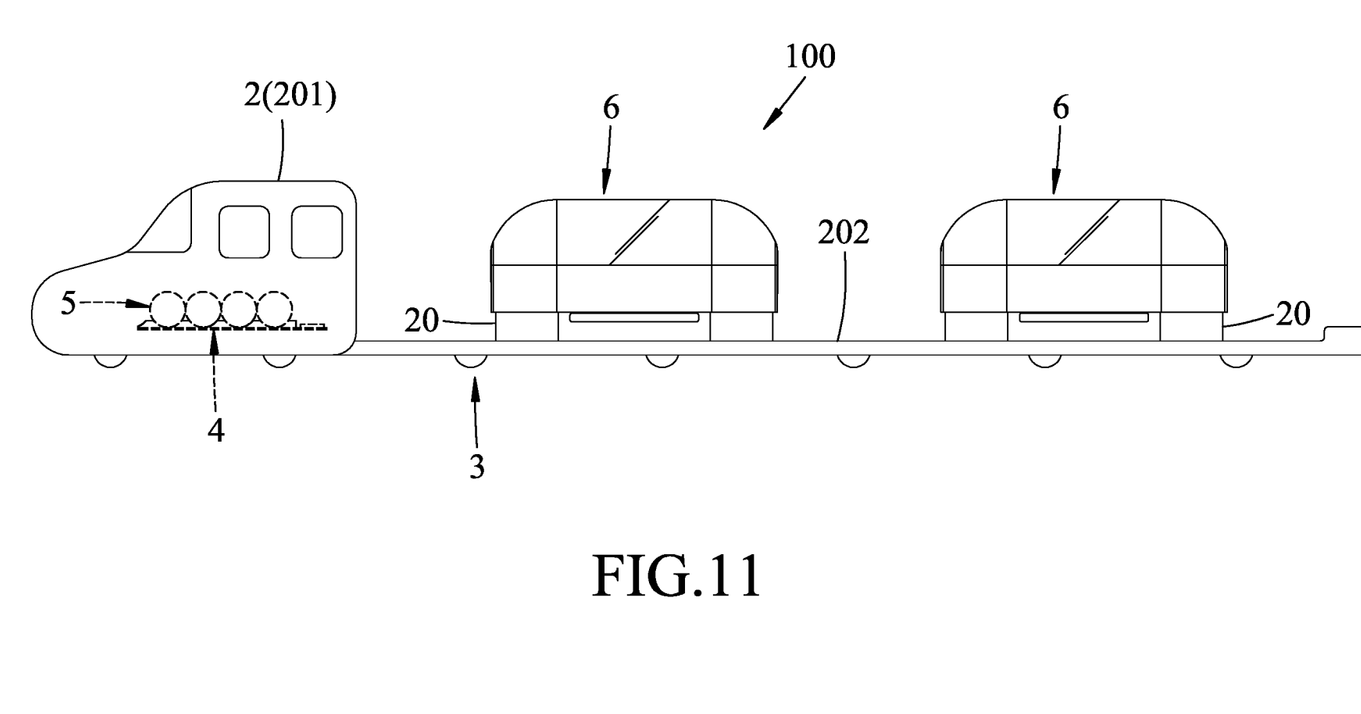
FIG. 11 is a schematic side view illustrating the meal delivery vehicle according to a second embodiment of the present disclosure.

Referring to FIG. 11, a second embodiment of the meal delivery vehicle 100 is similar to the first embodiment and includes a plurality of cover units 6. In this embodiment, the vehicle unit 2 includes a locomotive 201, a carrier 202 co-movably connected to the locomotive 201, and a plurality of the vehicle bodies 20 disposed on the carrier 202. The control unit 4 and the power supply unit 5 are mounted on the locomotive 201 and the cover units 6 are mounted respectively on the vehicle bodies 20. The wheel unit 3 is rotatably mounted under the locomotive 201 and the carrier 202 for allowing the vehicle unit 2 to move easily. In this way, the second embodiment is capable of carrying more foods than the first embodiment and possesses the advantages of the first embodiment.

Note that the vehicle bodies 20 may be connected by a plurality of linking rods (not shown) to increase stability of the vehicle unit 2 when moving along the rail 82 (see FIG. 2).

Figure 12:
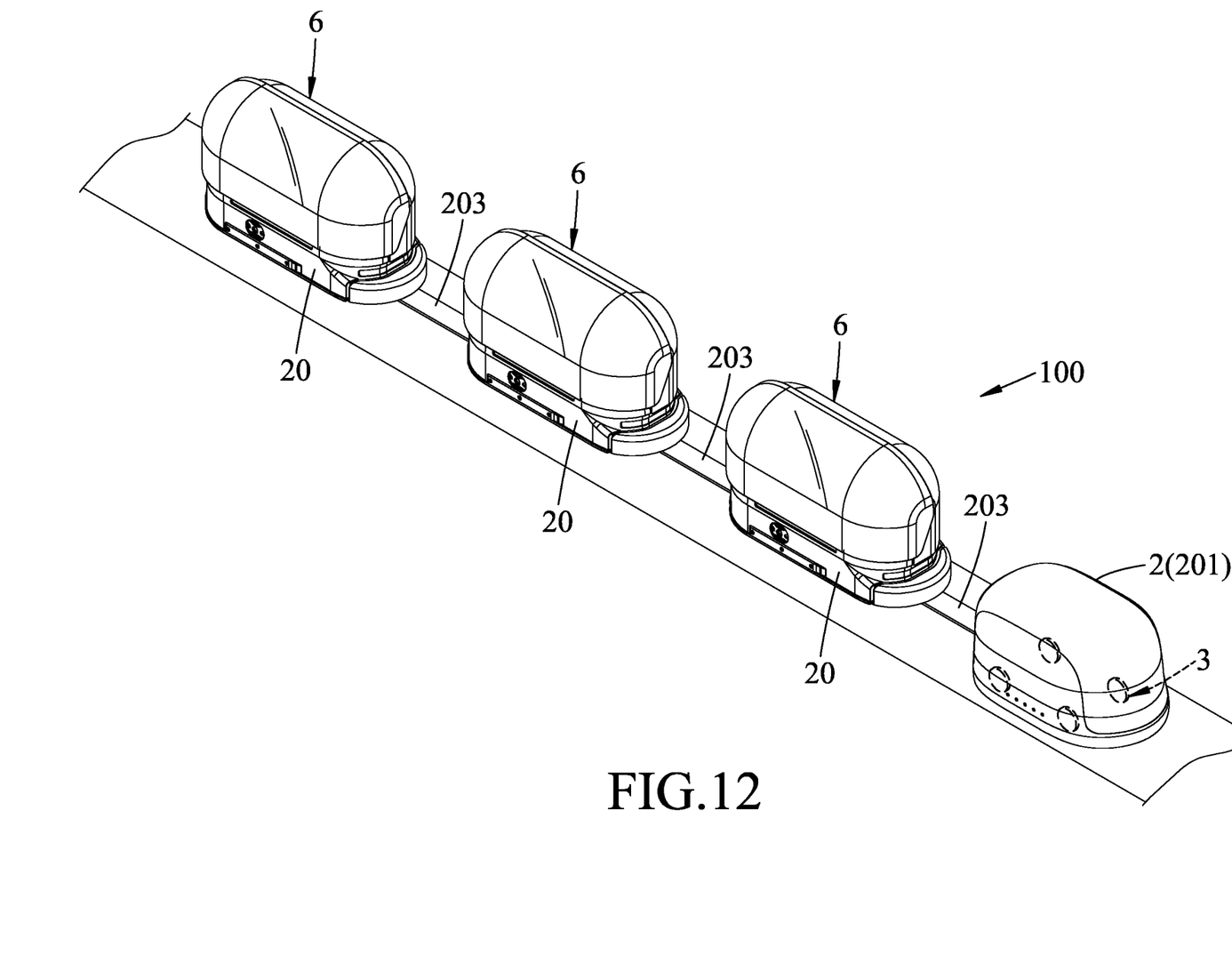
FIG. 12 is a schematic perspective view illustrating the meal delivery vehicle according to a third embodiment of the present disclosure.

Referring to FIG. 12, a third embodiment of the present disclosure is shown. The third embodiment is similar to the first embodiment and the difference therebetween resides in the following. In the third embodiment, the meal delivery vehicle 100 includes a plurality of cover units 6, and the vehicle unit 2 includes a locomotive 201, a plurality of vehicle bodies 20 and a plurality of linking rods 203. The locomotive 201 is connected to one of the vehicle bodies 20 and the wheel unit 3 is mounted under the locomotive 201. The cover units 6 are respectively mounted on the vehicle bodies 20. Each of the linking rods 203 pivotally interconnects two adjacent ones of the vehicle bodies 20. In this way, the third embodiment can carry more foods than the first embodiment and also possesses the advantages of the first embodiment.

Figure 13:
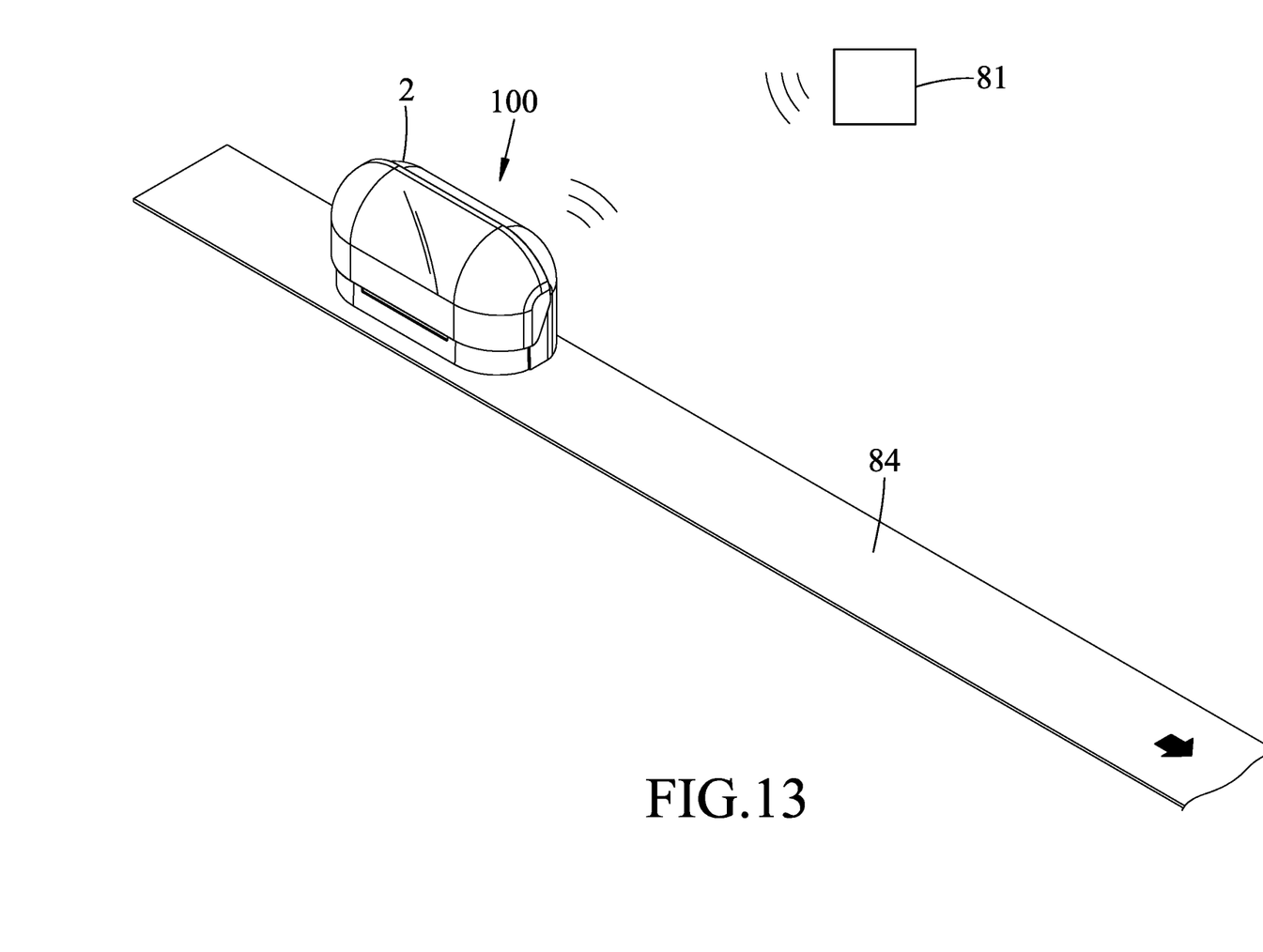
FIG. 13 is a schematic perspective view of the meal delivery vehicle according to a fourth embodiment of the present disclosure mounted on a conveyer.

Referring to FIG. 13, a fourth embodiment of the meal delivery vehicle 100 of the present disclosure is shown. In the fourth embodiment, the rail 82 is replaced by a conveyer belt 84 for conveying the vehicle unit 2 and the wheel unit 3 described in the first to the third embodiment is omitted. The conveyer belt 84 is controlled by the central control device 81 wirelessly to convey the vehicle unit 2 to a designated position. The fourth embodiment possesses the advantages of the first embodiment and can be used in combination with any one of the first to the third embodiments.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A meal delivery vehicle for delivering foods, comprising:
a vehicle unit having at least one carrier surface adapted for carrying the foods;
at least one cover unit mounted to said vehicle unit, cooperating with said carrier surface to define an accommodating space that is adapted to receive the foods therein, and including
two mounting seats mounted on said vehicle unit and spaced apart from each other in a front-rear direction,
a fresh-keeping cover including a rotated portion and a connecting portion that are mounted respectively to said mounting seats, said rotated portion being rotatable about a rotating axis that extends through said mounting seats, that is parallel to the front-rear direction, and that is located above said carrier surface along an up-down direction transverse to the front-rear direction, rotation of said rotated portion about the rotating axis resulting in conversion of said fresh-keeping cover between a covering state, where said fresh-keeping cover covers said accommodating space, and an open state, where said fresh-keeping cover uncovers said accommodating space to allow said accommodating space to be in spatial communication with ambient surroundings, and
a driving device operable for converting said fresh-keeping cover between the covering state and the open state, including a rotating member that is rotatably mounted to one of said mounting seats which is mounted with said rotated portion and that is connected co-rotatably to said rotated portion for rotating said rotated portion such that said fresh-keeping cover is converted between the covering state and the open state, a linkage set connected to said rotating member for driving rotation of said rotating member, and a driver module connected to said linkage set for driving said linkage set to rotate said rotating member; and
a power supply unit electrically connected to said driving device to provide electricity thereto.

2. The meal delivery vehicle as claimed in claim 1, wherein said fresh-keeping cover includes
a fixed cover part mounted fixedly to said mounting seats and having a top edge located above the rotating axis along the up-down direction, and
a movable cover part having said rotated portion and said connecting portion that is connected pivotally to said fixed cover part, and further having a first edge that is disposed between said rotated portion and said connecting portion, that is disposed adjacent to said top edge of said fixed cover part when said fresh-keeping cover is in the open state, and that is disposed adjacent to said carrier surface when said fresh-keeping cover is in the covering state.

3. The meal delivery vehicle as claimed in claim 2, wherein said movable cover part is detachably connected to one of said mounting seats mounted with said connecting portion, and is detachably connected to said rotating member to allow said movable cover part to be detached from the remaining portion of said meal delivery vehicle.

4. The meal delivery vehicle as claimed in claim 3, wherein one of said mounting seats which is mounted with said connecting portion includes a first positioning member, said rotating member including two second positioning elements, said movable cover part including a first connecting element that is formed at said connecting portion and that is pivotally connected to said first positioning member, and two second connecting elements that are formed at said rotated portion, and that are connected respectively to said second positioning elements of said rotating member such that said movable cover part is driven to rotate about the rotating axis by said rotating member through said second positioning elements.

5. The meal delivery vehicle as claimed in claim 3, wherein said driver module includes a rotating shaft rotatable about a central axis thereof, said linkage set including a swing arm connected co-rotatably to said rotating shaft and a link pivotally interconnecting said swing arm and said rotating member so as to drive said rotating member to rotate about the rotating axis when said rotating shaft is rotated.

6. The meal delivery vehicle as claimed in claim 2, wherein said movable cover part is made of a light transmissive material to allow said accommodating space to be observed.

7. The meal delivery vehicle as claimed in claim 1, further comprising a control unit including a control module that is electrically connected to said driver module of said driving device for controlling operation of said driver module, said cover unit further including a sensor module adapted to sense presence of the foods in said accommodating space, and electrically connected to said control module to output a corresponding signal to said control module.

8. The meal delivery vehicle as claimed in claim 7, further comprising a wheel unit that is rotatably mounted to said vehicle unit that is electrically connected to said power supply unit for receiving electricity provided therefrom so as to drive said wheel unit to rotate.

9. The meal delivery vehicle as claimed in claim 7, wherein said control unit further includes a communication module communicatively connected to said control module for receiving the signal output by said sensor module and adapted to communicate with a central control device.

10. The meal delivery vehicle as claimed in claim 7, further comprising a light emitting device electrically connected to said control module to be controlled thereby and adapted for providing illumination to the foods.

11. The meal delivery vehicle as claimed in claim 10, wherein said light emitting device includes a first light element mounted to an inner surface of said fresh-keeping cover, disposed in said accommodating space, and adapted for illumination of the foods, and a second light element mounted to said vehicle unit for decoration and notifying arrival of the foods.

* * * * *